June 23, 1959 J. MINTZ 2,891,803
COLLAPSIBLE SHOPPING CART
Filed March 27, 1957 2 Sheets-Sheet 1
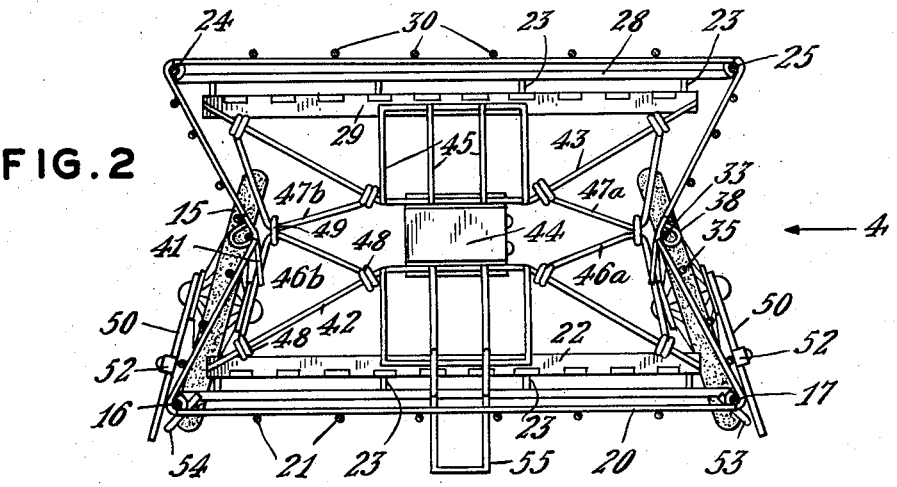
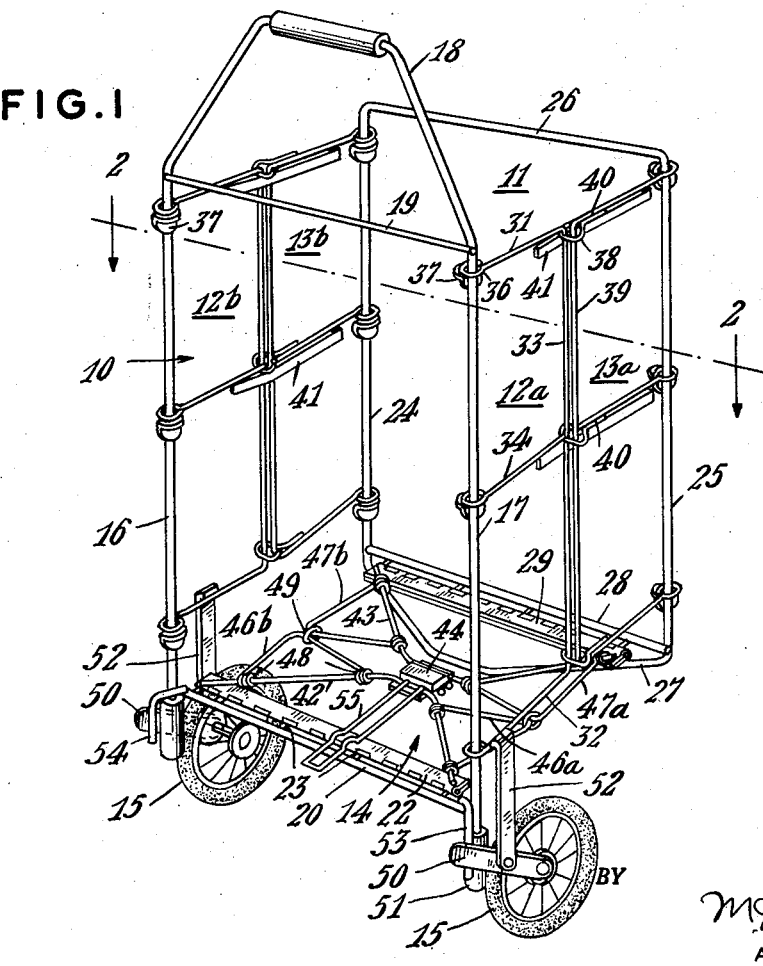
INVENTOR.
J. MINTZ June 23, 1959  J. MINTZ  2,891,803
COLLAPSIBLE SHOPPING CART Filed March 27, 1957  2 Sheets-Sheet 2

INVENTOR.
J. MINTZ
BY
*M. J. Reynolds*
ATTORNEY

United States Patent Office 2,891,803
Patented June 23, 1959

2,891,803

COLLAPSIBLE SHOPPING CART

Julius Mintz, New York, N.Y.

Application March 27, 1957, Serial No. 648,803

5 Claims. (Cl. 280—36)

This invention relates to a collapsible cart and more particularly to a two wheeled cart suitable for grocery and similar shopping purposes.

One of the objects of the invention is to provide a carrier of the above nature which is simple in construction, and which may be collapsed into a compact form for storage in a closet, hallway or the like.

Another object is to provide such a shopping cart having a bottom composed of articulated sections forming a flat rigid base in the open position of said cart but in which such sections may be folded by operation of a foot pedal to initiate the closing or collapsing operation of the cart.

Other objects and advantages will hereinafter appear.

In accordance with the present invention I provide a collapsible shopping cart having a rigid back panel provided with a handle at its upper end and wheel pivoting bearing members at its lower end, a rigid front panel having a foot portion, two pairs of interconnecting side panels or sections hinged to the rear and front panels and to each other, for inward folding movement, a base composed of a pair of triangular sections, hinged to the lower ends of the rear and front panels respectively and to each other for collapsing movement, and angular filler sections one of said base sections having a foot engageable portion fulcrumed at the base of the rear panel to initiate closure of the carrier and a pair of wheels carried by the rear side sections and pivoted to the rear panel for swinging movement into a plane parallel to the rear panel in the collapsed condition of the carrier.

The invention will best be understood by reference to the accompanying drawings in which:

Fig. 1 is a perspective view of the shopping cart in its open condition;

Fig. 2 is a sectional view of the cart in a partially closed position, taken on line 2—2 of Fig. 1;

Figure 3:
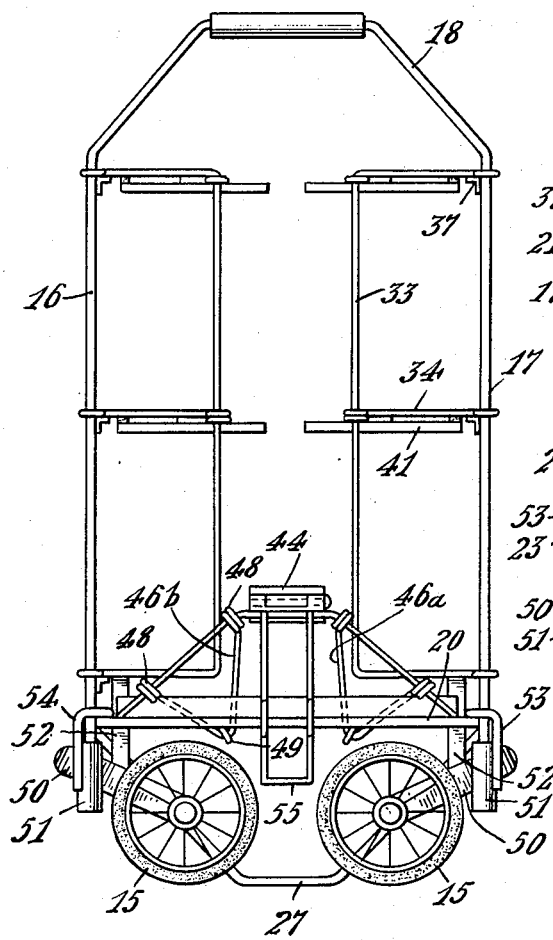
Fig. 3 is a rear elevation of the cart in the closed position thereof.

In considering Figs. 1 and 3 it is to be understood that, for the sake of clarity, the structure has been skeletonized by omission of the numerous vertical and horizontal filler wires which are welded across the frame members shown to form the cage like structure of the cart.

Referring first to Fig. 1 the cart is composed of a rigid rear panel 10, a rigid front panel 11, opposite rear side sections 12a, 12b hinged to the rear section, two front side sections 13a, 13b, hinged to the front section, the respective rear and front sections 12a, 13a and 12b, 13b also being hinged to each other, a base 14 composed of a number of articulated sections and a pair of wheels 15 carried by the rear side sections 12a, 12b.

The rear panel 10 comprises an inverted U-shaped frame composed of side members 16 and 17 and a handle portion 18. A number of transverse braces, such as 19, 20, extend between the side members and are welded thereto, and a plurality of vertical filler members, such as 21 (Figs. 2 and 4), extend between the upper and lower cross braces 19, 20. One blade of a hinge 22 is also secured to the lower brace 20 by studs 23.

The front panel 11 comprises a frame composed of side portions 24, 25, a top portion 26 and a foot portion 27. A lower cross brace 28, welded to the side portions, also supports one blade of a hinge 29. Vertical fillers 30 (Fig. 2) extend between and are welded to the cross brace 28 and top frame portion 26.

The rear side sections 12a, 12b each comprise a frame composed of horizontal top and bottom portions 31, 32, a connecting vertical portion 33 and an intermediate horizontal portion 34. Vertical fillers 35 extend across the horizontal portions 31, 34 and 32 and are welded thereto. The free ends of the horizontal portions 31, 34 and 32 are provided with loops 36 bent around the rear frame portions 16 and 17 and serve as hinge connections. Stops, such as 37, welded to the frame portions 16, 17 beneath the loops 36 serve to retain the side sections 12a, 12b in the proper elevated relation to the rear section.

The front side sections 13a, 13b are similar to the rear sections 12a, 12b and are hingedly carried by the front frame 11 in the same manner. The front and rear side sections are interconnected by loops such as 38, passing around the vertical portions 33, 39 thereof and secured, as by welding at points 40, to the horizontal portions of the front sides 13a, 13b. A number of stop members 41 carried by the inner faces of the front side sections 13a, 13b, engage the inside faces of the rear side sections to limit the outward pivotal movement of the side sections to a common plane.

Figure 4:
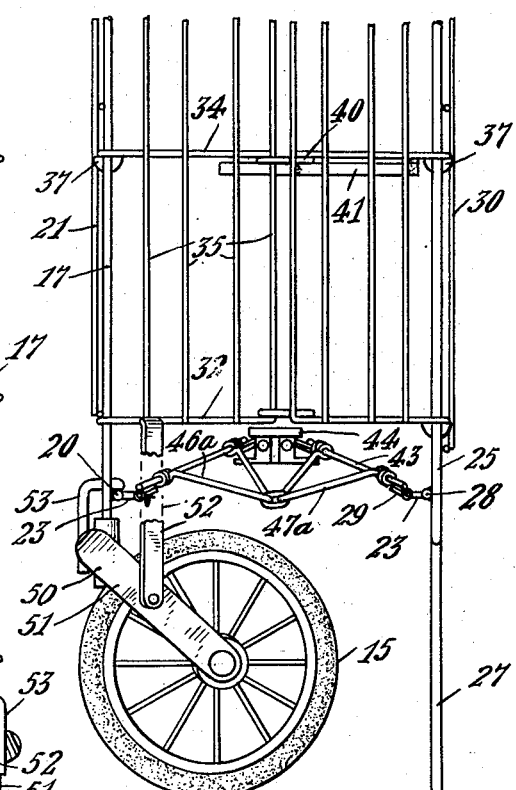
Fig. 4 is a partial side elevation, in enlarged scale, viewed in the direction of the arrow 4 of Fig. 2.

The base 14 is composed of a rear and front angular shaped frames 42, 43, welded to one blade of the hinges 22 and 29, respectively, the apex of both angular frames being pivotally secured to a hinge block 44 whereby the sections 42, 43 may break upwardly at their apexes in a collapsing movement of the cart, as shown in the partially closed and closed positions of Figs. 4 and 3, respectively. A number of filler wires, such as 45 (Fig. 2) extend between the hinges 22, 29 and the frames 42, 43. Angular filler sections 46a, 47a and 46b, 47b, having their free ends 48 loosely looped about the frames 42, 43 and their apexes coupled by a free loop 49, complete the base structure.

The wheels 15 are carried by one end of bars 50, said bars having thereof bearing sleeves 51, welded thereto adjacent the opposite ends thereof. The bearing sleeves 51 are pivotally mounted on the lower free ends of the rear side frame portions 16, 17. The right and left pivot bars 50 are rigidly secured to the rear side sections 12a, 12b, respectively, by members 52 welded both to its corresponding pivot bar 50 and the side frame 12a or 12b, whereby the wheels are retained in the plane of the rear side frames in both open or closed condition of the cart. A pair of stops 53, 54, carried by the rear cross brace 20 extend into the path of the free ends of the pivot bars 50 to limit the outward pivotal movement of the wheels to planes normal to the rear panel 10.

The rear base section 42 has a pedal member 55 rigidly welded thereto and extending over the rear cross brace 20 so as to fulcrum thereon.

The operation of closing the shopping cart is as follows: With the handle portion 18 held by one hand, the pedal 55 is depressed by foot, fulcruming over the cross brace 20 to break the apex ends of frames 42 and 43 upwardly. The upward movement of frames 42, 43 forces the angular fillers 46a, 47a and 46b, 47b to break downwardly about the loops 49 as shown in Fig. 4. This upward folding of the base frames 42, 43 draws the front panel 11 towards the rear panel 10, causing the side frames 12a, 13a and 12b, 13b to break inwardly, Due to the triangular shape of the base members 42, 43 the side members fold together between the legs of the base sections 42, 43, while the angular filler sections 46a, 47a and 46b, 47b, fold together downwardly out of the path of the side members. The inward movement of the rear side sections 12a, 12b carries the wheels 15 inwardly so that the wheels and all sections of the carriage are closely folded into planes parallel to the front and rear panels. Thus the entire carriage in its collapsed condition occupies from front to rear panel, only two to three inches and may be readily stored in a small space.

It will be understood that numerous changes may be made in the structural details of the cart without departing from the essential attributes of the invention and I contemplate all such changes as come within the scope of the appended claims.

What I claim is:

1. A collapsible shopping cart having a rigid front panel and a rigid rear panel, a pair of rear side walls, means for hinging said rear side walls one to each side of said rear panel, a pair of front side walls, means for hinging said front side walls one to each side of said front panel, the front and rear side walls at each side being pivotally secured together to fold inwardly, a collapsible bottom for said cart, each of said panels and sides being of open welded wire mesh construction, and each of said hinging means including loopings of the wire forming said mesh encircling other wires thereof, a wheel supporting structure rigidly secured to and depending from each of said rear side walls for inward folding movement therewith, a wheel rotatably mounted on each of said structures, bearing means carried by each of said structures, and a pair of shaft members integral with said rear panel disposed one in each of said bearing means and serving as fulcrums for inward folding movement of said wheel carrying structures said collapsible bottom comprising a plurality of pivotally interconnected members hingedly secured to the front and rear panels adjacent the base thereof and foldable upwardly into planes substantially parallel to said front and rear panels.

2. A shopping cart as defined in claim 1 in which said plurality of pivotally interconnected collapsible bottom members are of substantially triangular shape with their apex portions disposed adjacent to each other, said pivotal interconnection comprising a hinge member connected to each of said apex portions.

3. A shopping cart as defined in claim 2 in which one of said base members has a pedal member secured thereto and protruding outwardly beyond one of said panels and fulcrum means for said pedal carried by said panel, said pedal serving, on depression thereof over said fulcrum to initiate the upward folding movement of said bottom members.

4. A shopping cart as defined in claim 2, in which said collapsible bottom includes two pairs of articulated filler members, the members of each pair being pivoted to each other and to one side portion of each of said triangular base members and foldable downwardly upon upward folding movement of said triangular base members.

5. A collapsible shopping cart having a rigid front panel and a rigid rear panel, two pairs of side panels, the panels of each pair of side panels being hinged together and to the corresponding sides of the front and rear panels, respectively, so as to fold inwardly, a collapsible base for said cart comprising a pair of substantially triangular shaped members having their respective base portions hingedly secured to the rear and front panels, respectively, means pivotally interconnecting the apex portions of said base members for upward folding movement into planes substantially parallel to said front and rear panels, two pairs of articulated angularly shaped side filler members, the members of each pair being pivoted to each other and to one side element of each of said triangular base members and foldable downwardly by the upward folding movement of said base members, a pedal member carried by one of said triangular base members and protruding outwardly beyond one of said panels, fulcrum means for said pedal carried by said one of said panels, whereby depression of said pedal over said fulcrum initiates the upward folding movement of said triangular base members, a pair of wheels and means for mounting said cart upon said wheels.

References Cited in the file of this patent

UNITED STATES PATENTS

| | | |
|---|---|---|
| 409,677 | Forman | Aug. 27, 1889 |
| 2,489,188 | Landry | Nov. 22, 1949 |
| 2,564,939 | Weast | Aug. 21, 1951 |
| 2,650,375 | Serrell | Sept. 1, 1953 |
| 2,797,927 | Raff | July 2, 1957 |